United States Patent Office 2,711,325
Patented June 21, 1955

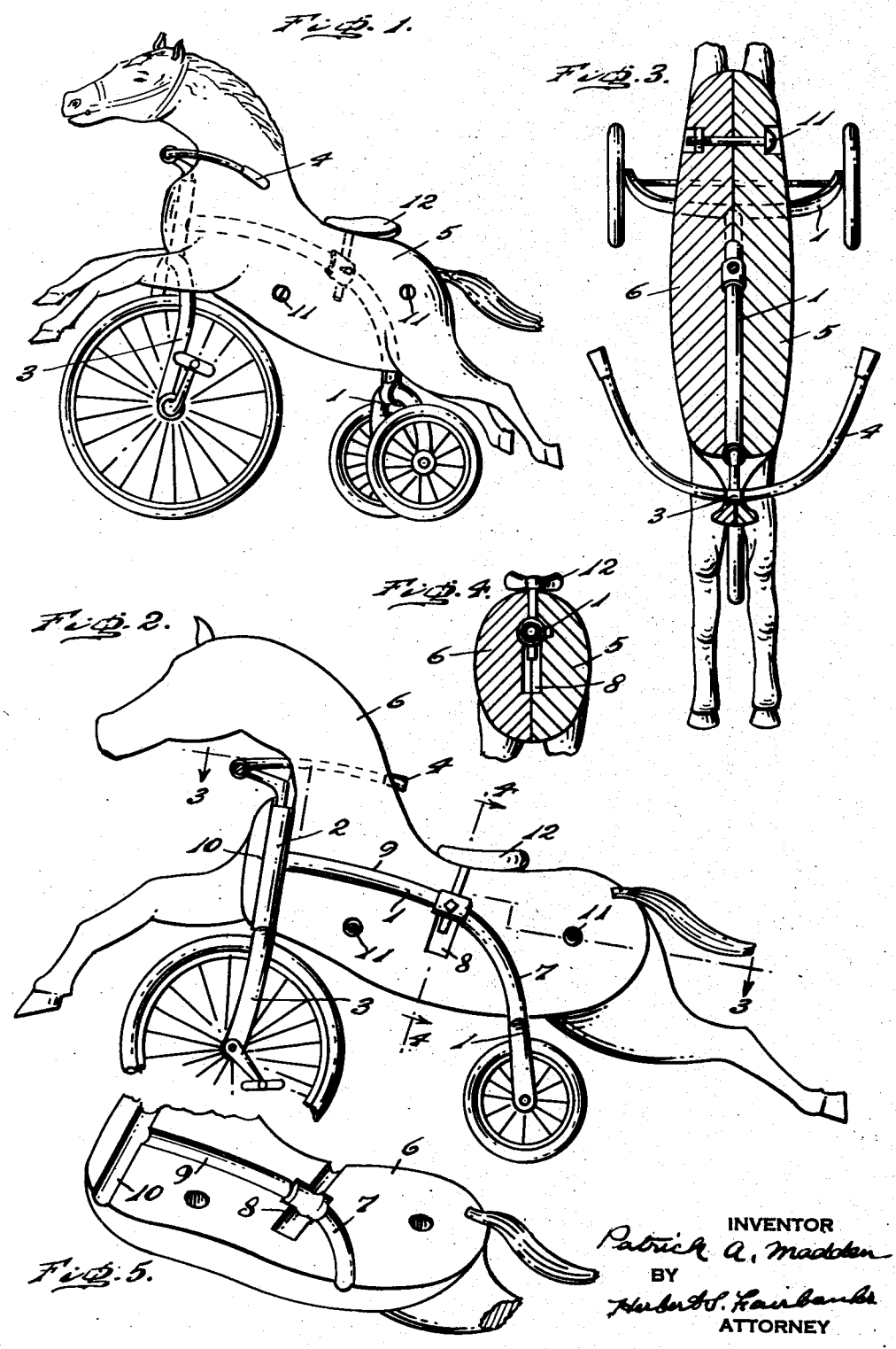

2,711,325

HORSE SIMULATING ATTACHMENT FOR TRICYCLES

Patrick A. Madden, Philadelphia, Pa.

Application May 16, 1952, Serial No. 288,167

2 Claims. (Cl. 280—1.188)

The object of this invention is to devise a novel construction and arrangement of a sectional horse recessed in a novel manner so that it can be clamped to the frame of a tricycle so that a child can be seated on the horse while riding the tricycle.

A further object of the invention is to devise a construction which a child can assemble and take apart.

With the foregoing and other objects in view as will hereinafter clearly appear, my invention comprehends a novel construction and arrangement of a horse which is recessed to receive and closely engage the frame of a tricycle.

It further comprehends a novel, sectional, simulated figure of an animal and means to secure the sections in assembled condition.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized and the invention is not limited to the exact arrangement and organization of these instrumentalities as herein set forth except by the scope of the appended claims.

Figure 1 is a perspective view of a horse embodying the invention in assembled condition with a tricycle.

Figure 2 is a side elevation showing one section of the horse with the frame of the tricycle in section.

Figure is a section on line 3—3 of Figure 2.

Figure 4 is a section on line 4—4 of Figure 2.

Figure 5 is a side elevation of one of the horse sections, partly broken away.

Similar numerals of reference indicate corresponding parts in the drawings.

Referring to the drawings:

A tricycle of any conventional construction has a frame 1 carrying the rear wheels, a post 2 in which the fork 3 carrying the driving wheel is mounted and a handle bar 4.

A simulated animal such as for example a horse is made in sections 5 and 6. The inner face of each section is recessed at 7, 8, 9 and 10 so that the component parts of the frame will have a close fit therein and the sections are firmly clamped to the frame when fastening devices 11 of any desired character are in place and tightened.

The frame of the tricycle, except for its connection with the wheels and the handle bar, is substantially concealed within the body of the animal, and the child sits on the horse while propelling the tricycle.

If desired the conventional seat 12 can be used, and the aperture or recesses 8 provide for the adjustment of the seat post to a desired height above the saddle of the horse, so that the child can sit upon the horse or upon the saddle as he or she may desire.

The sections of the animal can be stamped from any desired material at a minimum of manufacturing cost.

The sections are preferably stamped or molded from plastic material and colored to resemble an animal.

The sections are recessed to receive the frame of a conventional tricycle so that no change is necessary in its construction, and one does not have to buy a special tricycle when he or she desires to employ the simulated animal.

Having thus described my invention, what I claim as new and desire to secure by Letters Patent is:

1. A simulated animal attachable to the frame of a tricycle, the tricycle being a completely operated vehicle which can be operated without change, comprising two animal sections symmetrical with respect to each other, the sections having in their inner faces matching semicircular grooves extending upwardly through the rear, bottom body portion and then curving forwardly to receive the top brace of the tricycle frame, and merging at their forward ends into matching semicircular grooves opening through the top and bottom portions of the animal's breast to receive the front tubular post carrying the front fork of the frame, with the handle bars extending rearwardly at opposite sides of the neck of the animal, and fastening devices securing the sections in clamped relationship with the top brace and the tubular post.

2. The construction defined in claim 1, having in addition matching vertical grooves in the sections opening through the back of the animal and extending downwardly below the top brace to provide clearance for vertical adjustment of the saddle post.

References Cited in the file of this patent

UNITED STATES PATENTS

| 922,484 | Jones | May 25, 1909 |
| 1,042,682 | Jackson | Oct. 29, 1912 |
| 2,177,552 | Ruble | Oct. 24, 1939 |
| 2,617,658 | James et al. | Nov. 11, 1952 |
| 2,643,133 | Lucchesi | June 23, 1953 |

FOREIGN PATENTS

| 15,479 | Great Britain | Dec. 24, 1914 |